J. H. PIFER.
BRAKE PEDAL.
APPLICATION FILED JULY 18, 1918.
1,300,768.
Patented Apr. 15, 1919.
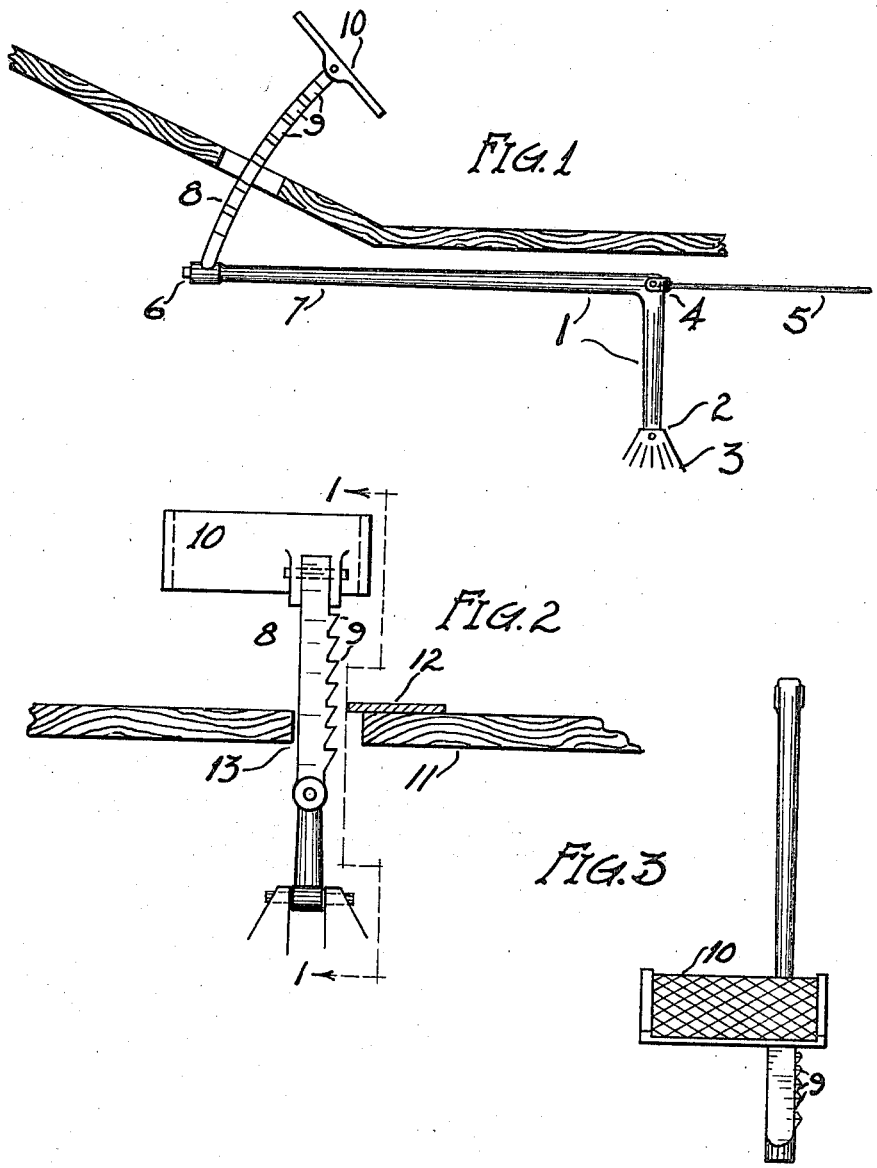
INVENTOR:
JOHN H. PIFER
BY: C. B. Enochs
ATTORNEY

UNITED STATES PATENT OFFICE.

JOHN H. PIFER, OF LARIMORE, NORTH DAKOTA.

BRAKE-PEDAL.

1,300,768.  Specification of Letters Patent.  Patented Apr. 15, 1919.

Original application filed January 28, 1918, Serial No. 214,224. Divided and this application filed July 18, 1918. Serial No. 245,574.

*To all whom it may concern:*

Be it known that I, JOHN H. PIFER, a citizen of the United States, and a resident of Larimore, in the county of Grand Forks and State of North Dakota, have invented certain new and useful Improvements in Brake-Pedals, of which the following is a specification.

This invention refers to an improved form of brake pedal and is a division of my copending application Serial #214,224, filed January 28, 1918, and entitled Four wheel drive trucks.

The object of my invention is to provide a brake pedal that under ordinary foot pressure will provide a service brake, but that by an easy manipulation of the foot will serve as a locking brake pedal.

With this and incidental objects in view the invention consists of certain novel features of construction and combination of parts, the essential elements of which are hereinafter described with reference to the drawing which accompanies and forms a part of this specification.

In the drawing Figure 1 is a section taken on the line 1—1 Fig. 2, Fig. 2 is a sectional detail of a foot board and brake pedal looking from the front of the vehicle to which it is applied, and Fig. 3 is a plan view of the brake pedal by itself.

As shown in the drawing a bell crank 1 is hinged at 2 to a frame member 3 and is connected at 4 by any suitable means to a brake rod 5 adapted to co-act with any suitable form of brake mechanism.

Journaled at 6 on the bell crank arm 7 the brake pedal comprises a segment 8 having ratchet teeth 9 on one side thereof and having attached to its upper end a foot tread 10 mounted on the segment 8 near one end of the tread so that pressure of a driver's foot will be normally in such a direction that the segment will be pressed against the surface 13 when the brake is applied as a service brake.

When, however, it is desired to lock the brake the driver presses downwardly on the foot tread and at the same time inclines his toe toward the left, thereby engages the ratchet 9 with the plate 12, thus locking the brake.

While I have described my invention and illustrated it in one particular design, I do not wish it understood that I limit myself to this construction, as it is evident that the invention may be varied in many ways within the scope of the following claims.

Claims:

1. In a device of the class described, a toothed member pivotally supported, a rigidly fixed tooth engaging member and means on said toothed member for normally holding it out of engagement with said tooth engaging member to allow said toothed member to be reciprocated freely up and down.

2. A brake operating mechanism comprising a pivoted lever, an operating member, having teeth, pivoted thereto, said operating member comprising a foot engaging piece eccentrically arranged in relation to said operating member and a stationary detent, the eccentricity of said foot engaging piece tending to keep the operating member removed from said detent during the operation thereof.

JOHN H. PIFER.

Copies of this patent may be obtained for five cents each, by addressing the "Commissioner of Patents, Washington, D. C."